(12) United States Patent
Yamagishi

(10) Patent No.: US 8,491,133 B2
(45) Date of Patent: Jul. 23, 2013

(54) PROJECTION APPARATUS

(75) Inventor: Shigekazu Yamagishi, Osaka (JP)

(73) Assignee: Panasonic Corporation, Kadoma-shi (JP)

( * ) Notice: Subject to any disclaimer, the term of this patent is extended or adjusted under 35 U.S.C. 154(b) by 180 days.

(21) Appl. No.: 13/111,962

(22) Filed: May 20, 2011

(65) Prior Publication Data

US 2011/0292649 A1    Dec. 1, 2011

(30) Foreign Application Priority Data

May 20, 2010   (JP) .................................. 2010-115989
May 18, 2011   (JP) .................................. 2011-111019

(51) Int. Cl.
*G03B 21/28*    (2006.01)

(52) U.S. Cl.
USPC ............... 353/94; 353/99; 353/102; 362/241; 362/232

(58) Field of Classification Search
USPC ............ 353/94, 87, 68, 98, 99, 102; 362/227, 362/232, 241
See application file for complete search history.

(56) References Cited

U.S. PATENT DOCUMENTS

| 4,061,911 A | * | 12/1977 | Krasin ............................. 362/20 |
| 4,338,006 A | * | 7/1982 | Ozeki .............................. 353/85 |
| 5,135,301 A | * | 8/1992 | Dreyer et al. ................... 353/85 |
| 5,241,333 A | * | 8/1993 | Rodriguez, Jr. ................. 353/87 |
| 2005/0083685 A1 | * | 4/2005 | Yeh et al. ...................... 362/227 |
| 2010/0085544 A1 | * | 4/2010 | Yoshimura et al. ............. 353/98 |

FOREIGN PATENT DOCUMENTS

| JP | 2005-221762 A | 8/2005 |
| JP | 2006-295584 A | 10/2006 |

* cited by examiner

*Primary Examiner* — William C Dowling
(74) *Attorney, Agent, or Firm* — Judge Patent Associates

(57) ABSTRACT

A plurality of light source sections each have a reflector and a light source that is a discharge lamp. The plurality of light source sections are in a positional relationship wherein all reflector center axes are orthogonal to each other and at least one reflector center axis is orthogonal to the optical axis of a projection optical system. Interchange means interchanges the locations of the plurality of light source sections when a light source section needs to be replaced. Reflection means guides, to a converging optical system, light from that light source section whose reflector center axis is perpendicular to the direction of gravity.

11 Claims, 8 Drawing Sheets

F I G. 2
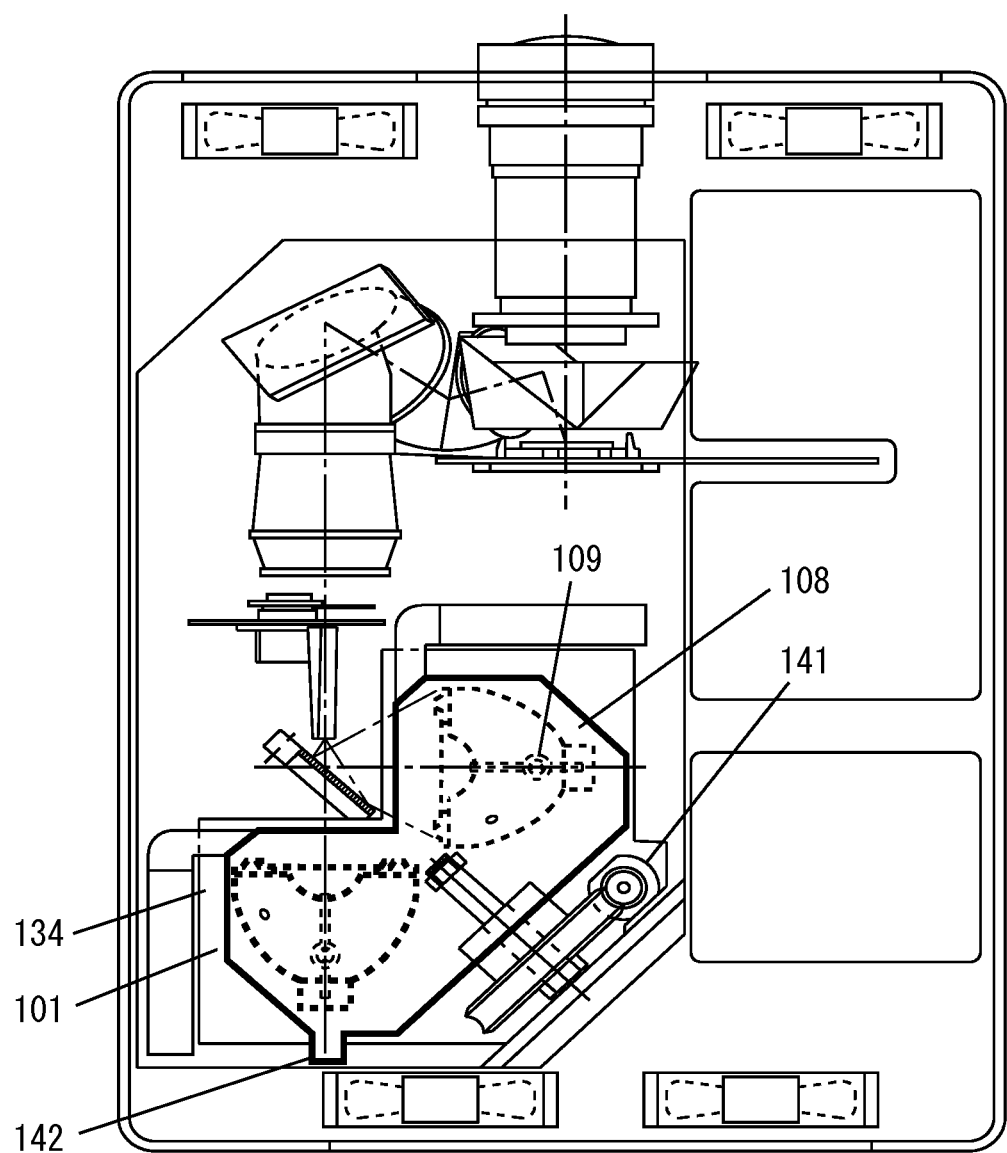

F I G. 6
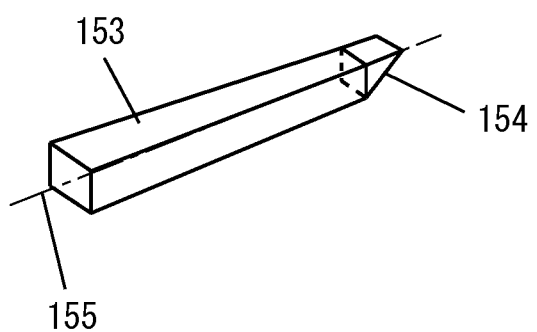

PROJECTION APPARATUS

CROSS REFERENCE TO RELATED APPLICATION

The disclosures of Japanese Patent Application Nos. 2010-115989, filed on May 20, 2010, and 2011-111019, filed on May 18, 2011, are incorporated herein by reference.

BACKGROUND OF THE INVENTION

1. Field of the Invention

The present invention relates to a projection apparatus that has a plurality of light sources and that is provided with a function enabling it to switch the in-use light source at light-source replacement time, to extend the period the apparatus is useable, and relates to projection apparatus technology for yielding predetermined light source service life in a use mode in which images are projected horizontally as well as in a use mode in which images are projected vertically.

2. Description of the Background Art

In general, projection apparatuses referred to as projectors mainly use, as a light source, a discharge lamp such as a high pressure mercury lamp, and converge light generated by the light source, in one direction by a reflector, to emit the light. The light source such as a discharge lamp provides a high brightness by using a small light-emitting element. However, the light source has the following problems, since a plasma state occurs by an electric discharge between electrodes, causing a high temperature close to 1000 degrees and a high pressure close to 200 atm.

The service life indicating a brightness half life is 1500 to 3000 hours and is not sufficient.

When the temperature distribution of a bulb becomes nonuniform, the bulb cannot resist the internal pressure and there is the possibility that degradation in brightness or rupture will occur.

In order to obtain desired performance, the inclination of an axis connecting discharge electrodes of the light source (hereinafter, referred to as a discharge electrode axis), in other words, a center axis of light converged by the reflector—which center axis is coincident with the discharge electrode axis (hereinafter, referred to as a reflector center axis)—needs to be equal to or less than about 10 degrees relative to a direction perpendicular to the direction of gravity.

Due to the above reasons, in projection apparatuses, the optical axis of a projection lens for projecting an image on a screen and the discharge electrode axis or the reflector center axis are orthogonal to each other, in order to allow projection to be performed even when the projection apparatuses are installed in an inclined manner.

A first object of the present invention is to lengthen the period during which even an apparatus using a discharge lamp having a short service life is useable. With regard to the first object, a technique in which a plurality of light sources are provided and the period the apparatus is useable is extended by switching and continuously using the light sources is proposed in Patent Document 1 (Japanese Laid-Open Patent Publication No. 2005-221762). In an apparatus structure (FIG. 9) proposed in Patent Document 1, two light source sections each including a light source and a reflector are provided such that the reflector center axes 161 thereof are orthogonal to the optical axis 160 of a projection lens. Then, the in-use light source is switched by rotating a mirror 162.

A second object of the present invention is to obtain a predetermined light source service life in both of use modes of horizontal projection and vertical projection of images. In general, projectors are designed such that a horizontally projected image is obtained. In recent years, there is a demand to use a vertically projected image for the purposes of advertisement. However, conventional projection apparatuses assume only a use mode in which images are projected horizontally, and it is difficult to rotate the apparatuses by 90 degrees to perform vertical projection of an image. In this case, it suffices to manufacture an apparatus dedicated for vertical projection of an image (see Japanese Laid-Open Patent Publication No. 2006-295584 (Patent Document 2)), but this single apparatus cannot solve the object to enable both of the use modes of horizontal projection and vertical projection.

The above apparatus structure proposed in Patent Document 1 can achieve the first object but cannot achieve the second object at the same time. In other words, when the reflector center axes 161 of all the light sources are orthogonal to the optical axis 160 of the projection lens as in the apparatus structure in FIG. 9, there is no problem if the apparatus is installed so as to extend in a horizontal direction that is perpendicular to the direction of gravity, as shown in FIG. 9. However, if the apparatus is rotated by 90 degrees and installed vertically, the reflector center axes 161 of the light sources are coincident with the direction of gravity. Thus, the above problem arises that the temperature distribution of the bulb becomes nonuniform, and the apparatus cannot be operated.

Further, Patent Document 2 has a description concerning an apparatus dedicated for vertical projection of an image but does not have any description concerning a light source section for implementing horizontal projection of an image.

SUMMARY OF THE INVENTION

Therefore, an object of the present invention is to provide a projection apparatus that can have a light source switching function that extends the period the apparatus is useable time and a projection mode selection function with which horizontal projection or vertical projection of an image is selectable, while ensuring desired light source performance and reliability.

The present invention is directed to a projection apparatus including a converging optical system for guiding light generated by a light source section, and a projection optical system for modulating light incident thereon from the converging optical system with an external signal and projecting an image generated by the modulation on a screen in an enlarged manner. In order to attain the object described above, the projection apparatus of the present invention comprises: a plurality of light source sections each having a reflector and a light source that is a discharge lamp and being in a positional relationship wherein all reflector center axes are orthogonal to each other and at least one reflector center axis is orthogonal to the optical axis of the projection optical system; interchange means for interchanging locations of the plurality of light source sections; and reflection means for guiding, to the converging optical system, light from that light source section whose reflector center axis is perpendicular to the direction of gravity.

All the reflector center axes of the plurality of light source sections and the optical axis of the converging optical system lie in the same plane. The interchange means interchanges that light source section whose reflector central axis is perpendicular to the direction of gravity, with another light source section by rotating a base to which the plurality of light source sections are fixed, about a rotation axis that lies in the same plane as the reflector central axis. The reflection means is desirably capable of an avoidance operation in order that light from that light source section whose reflector center axis is coincident with the optical axis of the converging optical system is guided to the converging optical system without blocking the light. The reflection means is at least unilaterally provided with a reflection function.

Further, the plurality of light source sections may be in a positional relationship wherein all the reflector center axes are orthogonal to each other and orthogonal to the optical axis of the projection optical system. In this case, the interchange means interchanges that light source section whose reflector central axis is perpendicular to the direction of gravity, with another light source section by rotating a base to which the plurality of light source sections are fixed, about a rotation axis that lies in the same plane as the reflector central axis. The reflection means is located near the portion of the converging optical system where light enters, and is configured to be rotatable about the optical axis of the converging optical system by 90 degrees.

The interchange means preferably goes into operation following lapse of a predetermined in-use time period of the light source or goes into operation when the light source is not lit. In addition, the reflection means preferably operates in accordance with output from an orientation sensor included in the projection apparatus or goes into operation upon having received input to switch between a setting for horizontal projection and a setting for vertical projection of images.

According to the present invention, a projection apparatus using a discharge lamp has a light source switching function that extends the period the apparatus is useable and also can have a projection mode selection function with which horizontal projection or vertical projection of an image is selectable.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a configuration diagram of the projection apparatus according to the first embodiment after the in-use light source is switched;

FIG. 6 is a perspective view of a rod integrator used in a third embodiment;

DESCRIPTION OF THE PREFERRED EMBODIMENTS

<First Embodiment>

Figure 1:
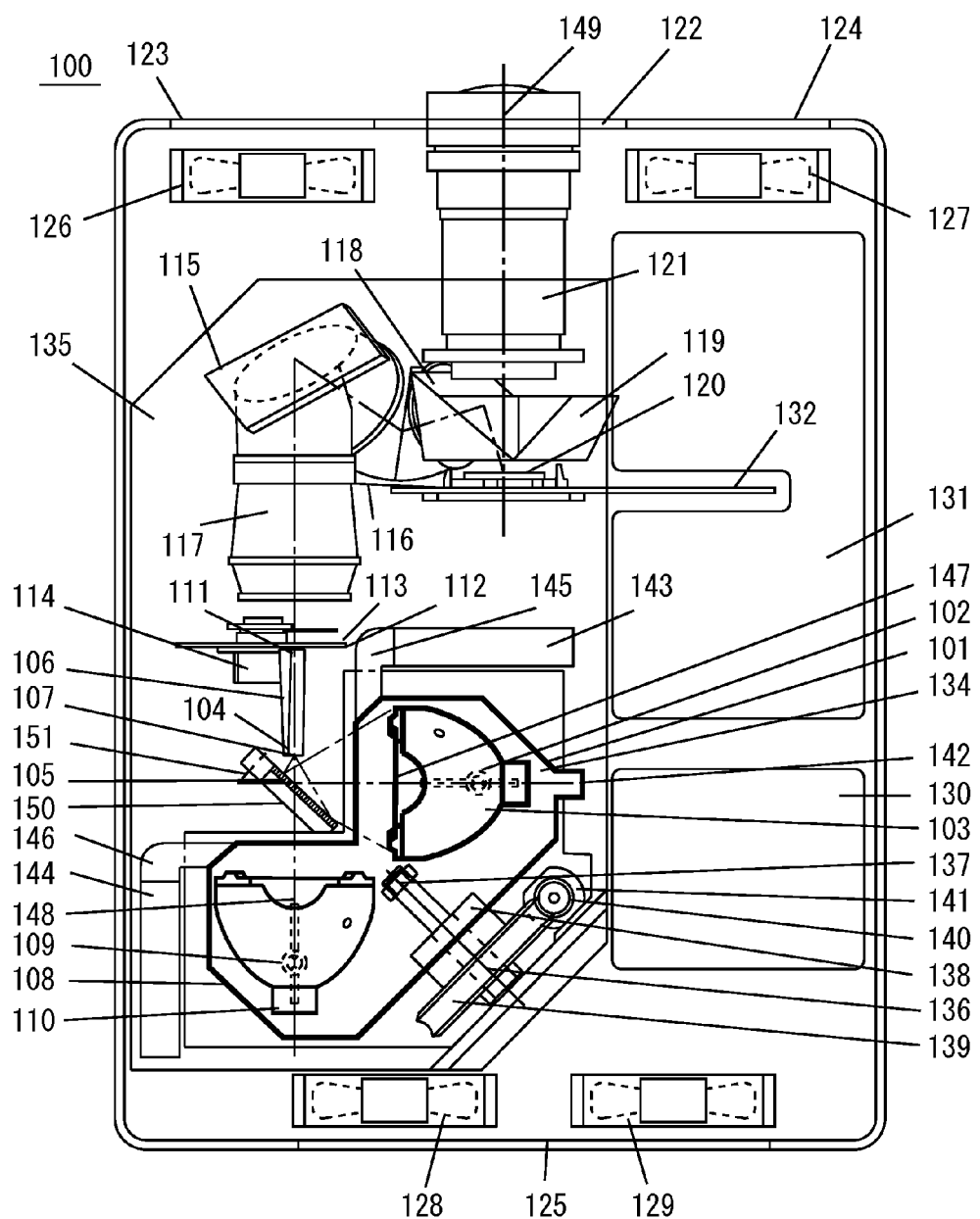
FIG. 1 is a configuration diagram of a projection apparatus according to a first embodiment of the present invention.

FIG. 1 is a diagram illustrating a configuration of a projection apparatus 100 according to a first embodiment of the present invention. A first light source section 101 includes a discharge lamp (light source) 102 that performs an electric discharge between electrodes within a bulb to cause plasma, thereby emitting high brightness light, and a reflector 103 having an elliptic reflection surface. The reflector 103 has one focal point on a light-emitting part of the discharge lamp 102 and another focal point 104 on an incident surface 107 of a rod integrator 106 through a moveable mirror 105. In addition, a second light source section 108 includes a discharge lamp (light source) 109 and a reflector 110 that have the same functions as those of the first light source section 101, and another focal point 104 of the reflector 110 is also located on the incident surface 107 of the rod integrator 106. The rod integrator 106 converts light having entered through the incident surface 107 into uniform light by repeatedly and internally reflecting the light, and emits the light from an exit surface 111.

The light emitted from the exit surface 111 of the rod integrator 106 is incident on a color wheel unit 112. The color wheel unit 112 includes a color wheel 113 in which a dichroic filter that has a plurality of different characteristics and that selects light to pass therethrough by wavelength is disposed on a circumference, and a motor 114 that rotates the color wheel 113. Colored light emitted through the color wheel 113 is incident on a DMD (digital mirror device) 120, which is an image display element, through a relay optical system 117 including redirecting mirrors 115 and 116, a field lens 118, and a total reflection prism 119.

The DMD 120 includes a plurality of micro-mirrors arranged two-dimensionally, and each micro-mirror changes its inclination in accordance with an input signal. A micro-mirror located at a pixel for white display changes its inclination in a direction that decreases the incident angle of light. Thus, light reflected by this micro-mirror and returned to the total reflection prism 119 has a high incident angle relative to an air gap in the total reflection prism 119, and hence passes through the total reflection prism 119 and a projection lens 121 and reaches a screen not shown, to provide white display. Meanwhile, a micro-mirror located at a pixel for black display changes its inclination in a direction that increases the incident angle of light. Thus, light reflected by this micro-mirror and returned to the total reflection prism 119 has a low incident angle relative to the air gap in the total reflection prism 119 and is guided to the outside of the projection lens 121, and hence does not reach the screen, whereby black display is provided on the screen.

In the projection apparatus 100, all images of red, green, and blue are displayed at least once during one field in synchronization with rotation of the color wheel 113 by using the above mechanism. In addition, FIG. 1 shows a top view when the projection apparatus 100 is in a use mode in which images are projected horizontally (is horizontally disposed).

The above optical unit is contained within a housing 122 that is provided with air inlets 123 and 124 and an air outlet 125. Inside the air inlets 123 and 124, suction fans 126 and 127 are provided, respectively. In addition, inside the air outlet 125 as well, discharge fans 128 and 129 are provided for efficiently discharging air that has taken heat inside the housing 122.

Further, in addition to the above components, a light source drive circuit 130, a video processing circuit 131, a DMD drive base plate 132, and an input/output terminal are provided in the housing 122.

In this configuration, the first light source section 101 and the second light source section 108 are fixed to the light source unit base 134. The light source unit base 134 is provided with bearing arms 137 and 138 for receiving a rotary shaft 136 extending from a wall of an optical base 135 that supports the various optical parts described above. The bearing arms 137 and 138 are configured such that the light source unit base 134 is rotatable about the rotary shaft 136 and is restricted so as not to be displaced in a thrust direction. A worm wheel 139 is fixed to the bearing arm 138 such that a rotational symmetry axis thereof is coincident with the rotary shaft 136. A worm gear 140 is screwed onto the worm wheel 139 and rotatably coupled to a motor 141 fixed to the optical base 135. Here, the center axis of the rotary shaft 136 and reflector center axes 147 and 148 of the first light source section 101 and the second light source section 108 lie in the same plane.

Due to such a configuration, the light source unit base 134 is allowed to rotate about the rotary shaft 136 but restricted by a positioning arm 142 such that its rotation stops at 180 degrees. In addition, at the position restricted by the positioning arm 142, lights from the first light source section 101 and the second light source section 108 are converged on the center of the incident surface 107 of the rod integrator 106. Further, at this position, air flows sent from light source fans 143 and 144 are guided by ducts 145 and 146 to the insides of the reflectors 103 and 110, thereby appropriately cooling the discharge lamps 102 and 109.

Moreover, at that time, the reflector center axes 147 and 148 of the first light source section 101 and the second light source section 108 are orthogonal to each other, and the reflector center axis 147 of the first light source section 101 is orthogonal to the optical axis 149 of the projection lens 121.

The moveable mirror 105 has a reflection function in at least one surface thereof and is fixed to a mirror frame 150. The mirror frame 150 is rotatably mounted to a supporting arm 151 extending from the optical base 135. The moveable mirror 105 is configured such that a position to reflect light emitted by the first light source section 101 or a position to avoid blocking of the lights emitted from the first light source section 101 and the second light source section 108 is selectable by rotation of the mirror frame 150.

First, in the first embodiment, the first object is achieved as follows. When the discharge lamp 102 of the first light source section 101 ruptures or comes to the end of its service life, the light source unit base 134 is rotated by using the worm gear 140, the worm wheel 139, and the motor 141 until the positioning arm 142 comes to a position facing the optical base 135, whereby the first light source section 101 and the second light source section 108 are located such that their locations are interchanged with each other as shown in FIG. 2. Therefore, the projector can continuously be used by lighting the discharge lamp 109 of the second light source section 108.

It should be noted that the light source interchange operation may be performed, for example, as follows. A main CPU of the projection apparatus 100 monitors a light source use time and determines a desired time for replacement, for example, a time that is 100 hours before an expected time when the lamp service life comes to the end, and the light source interchange operation can automatically or manually be performed in accordance with this determination. When the light source interchange operation is manually performed, the main CPU notifies a user through a screen display, illuminating a main-unit LED, or the like that it has come to the time for replacement, thereby prompting the user to manually perform the light source interchange operation. Further, when determining the desired time for replacement, the main CPU ends use of the apparatus, and the light source interchange operation can automatically be performed when the user powers on the apparatus again. Moreover, the main CPU may receive a light source non-lighting signal from the light source drive circuit, and the light source interchange operation may automatically or manually be performed.

Figure 3:
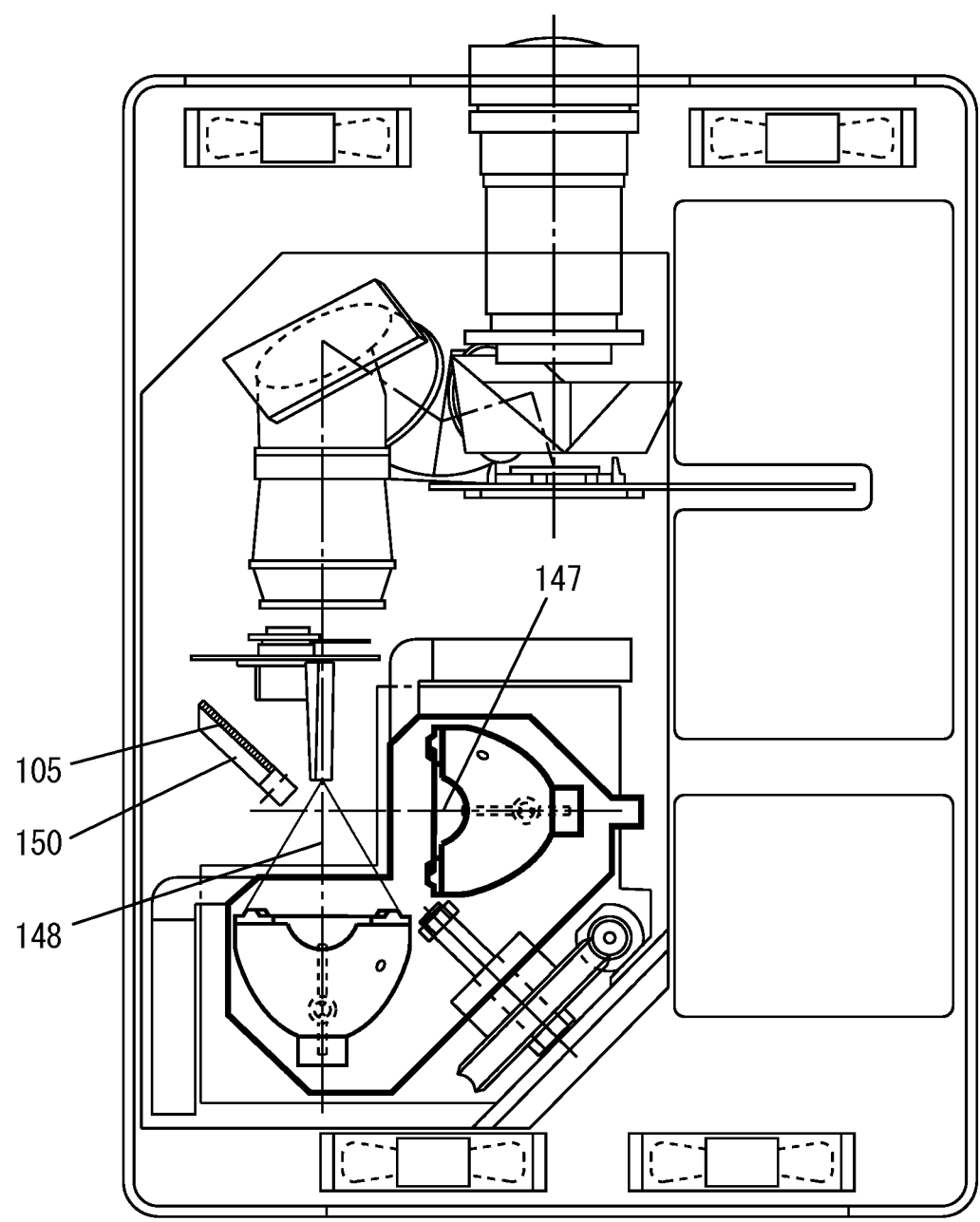
FIG. 3 is a configuration diagram of the projection apparatus according to the first embodiment when the projection apparatus is vertically disposed and used.

Next, in the first embodiment, the second object is achieved as follows. When the projection apparatus 100 is disposed horizontally and used (in horizontal projection of an image), in other words, when the sheet plane of FIG. 1 is perpendicular to the direction of gravity, an inclination of each of the reflector center axes 147 and 148 of the first light source section 101 and the second light source section 108 is also kept equal to or lower than about 10 degrees relative to a direction perpendicular to the direction of gravity. On the other hand, when the projection apparatus 100 is disposed vertically and used (in vertical projection of an image), in other words, when the sheet planes of FIGS. 1 and 2 are parallel to the direction of gravity, an inclination of the reflector center axis 148 of the second light source section 108 is kept equal to or lower than about 10 degrees relative to the direction perpendicular to the direction of gravity. Thus, when the projection apparatus 100 is disposed vertically and used, the moveable mirror 105 is moved to a position shown in FIG. 3 by rotating the mirror frame 150, and the light emitted by the second light source section 108 is caused to enter the rod integrator 106. This operation allows the projection apparatus 100 according to the first embodiment to be used when disposed horizontally or vertically.

It should be noted that, for example, other than the case where the user manually makes a selection, the projection mode selection operation may automatically be performed when the main CPU of the projection apparatus 100 monitors an orientation sensor such as a gravity sensor and determines that the orientation of the apparatus has changed by 90 degrees. Further, the main CPU can determine whether an input signal indicates a horizontally long video image or a vertically long video image, and can automatically perform the projection mode selection operation.

As described above, the projection apparatus 100 according to the first embodiment of the present invention can have a light source switching function and a projection mode selection function while ensuring desired light source performance and reliability.

<Second Embodiment>

Figure 4:
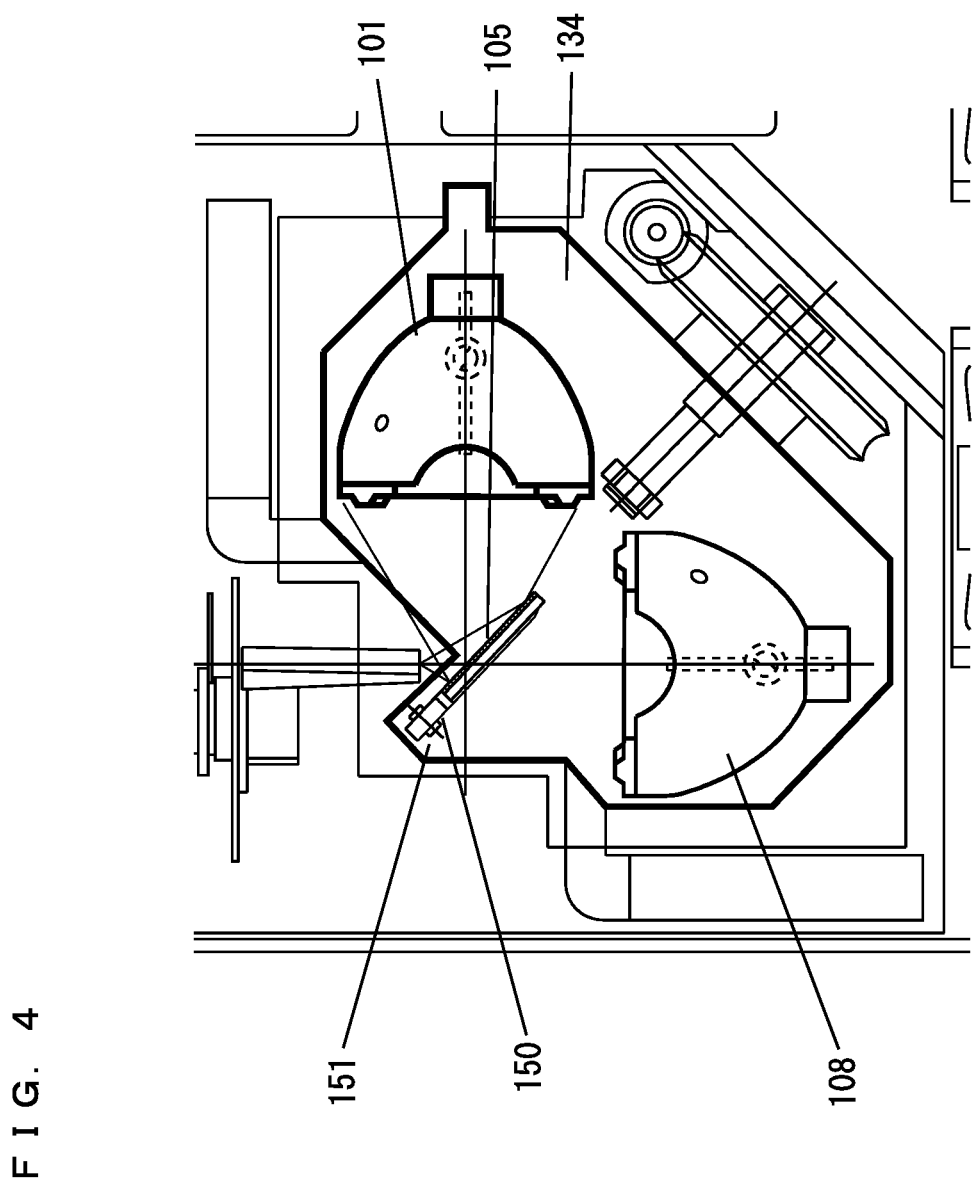
FIG. 4 is a configuration diagram of a projection apparatus according to a second embodiment of the present invention.

FIG. 4 is a diagram illustrating a configuration of a projection apparatus 100 according to a second embodiment of the present invention. In FIG. 4, a portion around the light source unit base 134 that is related to the second embodiment is shown in an enlarged manner. The projection apparatus 100 according to the second embodiment differs from the projection apparatus 100 according to the first embodiment described above, in that the supporting arm 151 to which the mirror frame 150 to which the moveable mirror 105 is fixed is rotatably mounted is located on the light source unit base 134.

Figure 5:
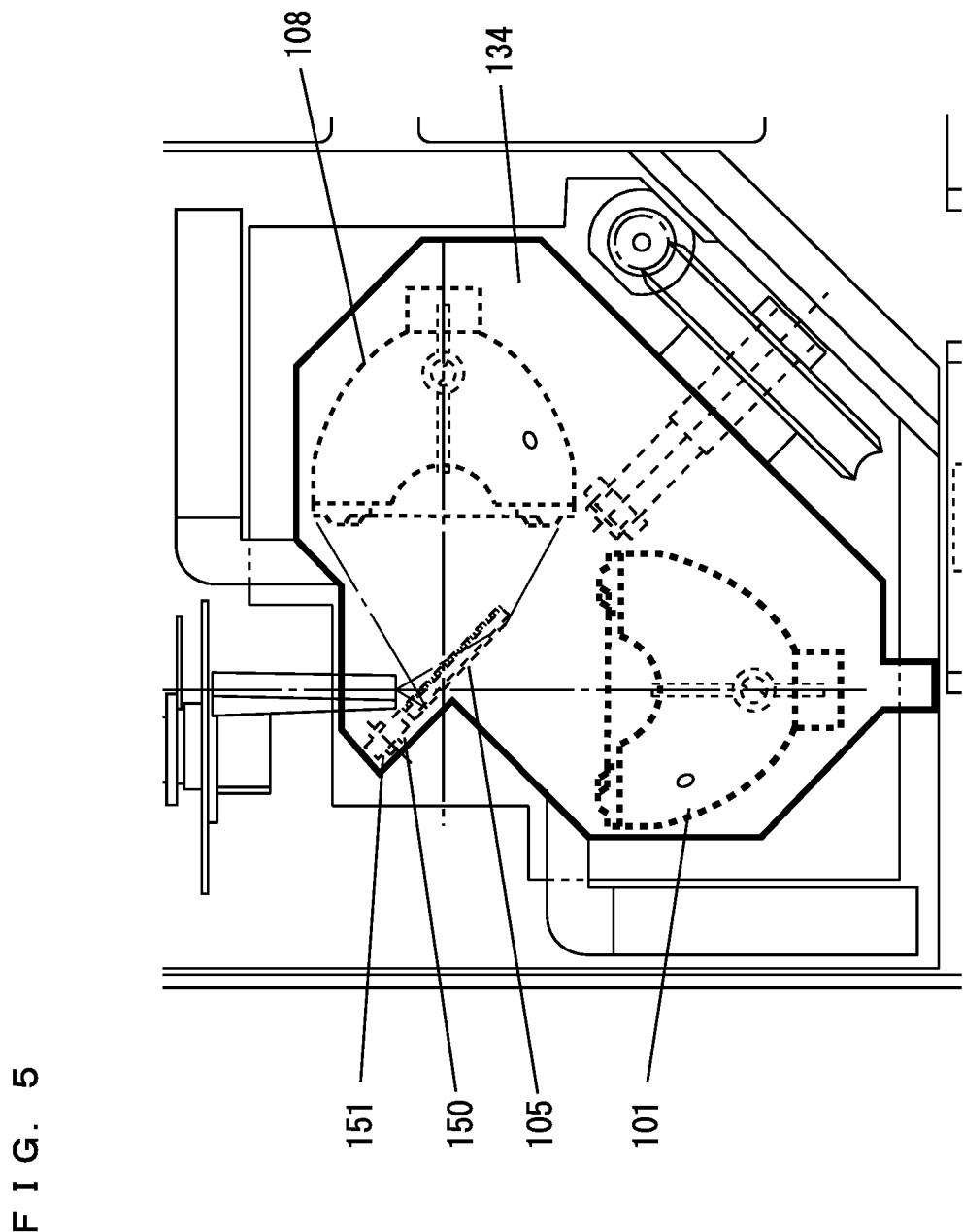
FIG. 5 is a configuration diagram of the projection apparatus according to the second embodiment after the in-use light source is switched.

In the second embodiment, the first object is achieved as follows. When the discharge lamp 102 of the first light source section 101 ruptures or comes to the end of its service life, the light source unit base 134 is rotated about the rotary shaft 136, whereby the first light source section 101 and the second light source section 108 are located such that their locations are interchanged with each other as shown in FIG. 5. At that time, the moveable mirror 105 is moved with the light source unit base 134 such that the front and back of the moveable mirror 105 are inverted with each other. Therefore, in the case where the moveable mirror 105 has a reflection function in only one surface thereof, displacement of the surface having the reflection function after the rotation of the light source unit base 134 needs to be taken into consideration when the second light source section 108 is used. In other words, when the second light source section 108 is lit, generated light enters the moveable mirror 105 through its back surface and reaches the reflection surface. The light is reflected by the reflection surface, exits the moveable mirror 105 through its back surface, and is incident on the incident surface 107 of the rod integrator 106. Therefore, the second light source section 108 needs to be installed to the light source unit base 134 and at a position that takes this displacement into consideration.

It should be noted that the method of achieving the second object in the second embodiment is the same as that in the first embodiment.

As described above, the projection apparatus 100 according to the second embodiment of the present invention can have a light source switching function and a projection mode selection function while ensuring desired light source performance and reliability.

<Third Embodiment>

The configuration of a projection apparatus 100 according to a third embodiment of the present invention differs from those in the first and second embodiments described above, in that the moveable mirror 105 is replaced with a redirecting prism 154, in that the locations of first and second light source sections 156 and 157 fixed to the light source unit base 134 are changed, and in the shape of a rod integrator 153.

FIG. 6 illustrates the shape of the rod integrator 153 used in the third embodiment. The redirecting prism 154 is located near an incident surface of the rod integrator 153. The redirecting prism 154 is supported so as to be rotatable about the optical axis 155 of the rod integrator 153 by 90 degrees.

Figure 7:
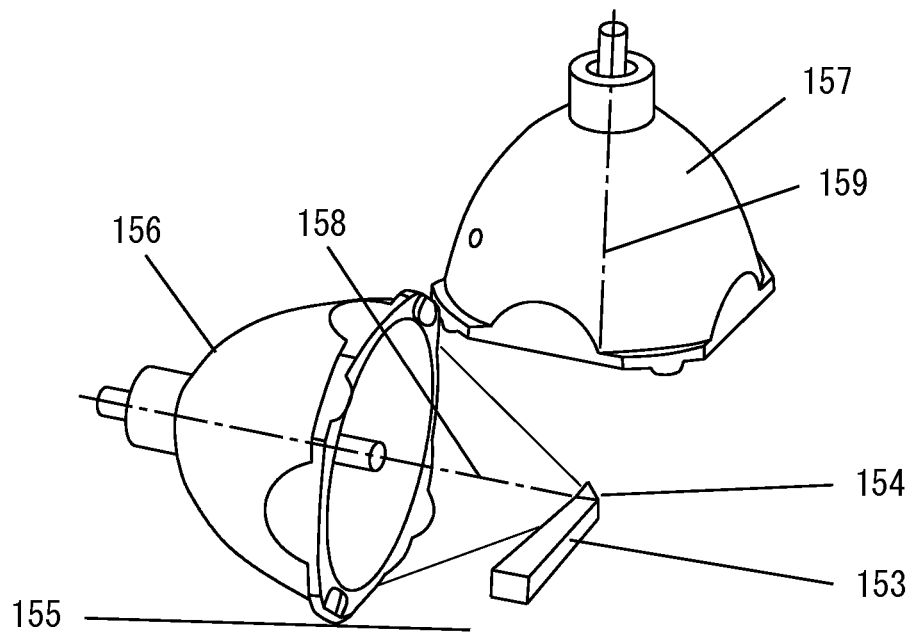
FIG. 7 is a diagram illustrating a lit-up state of a first light source section in the third embodiment.

FIG. 7 is a diagram illustrating a positional relationship among the first light source section 156, the second light source section 157, and the rod integrator 153. The reflector center axis 158 of the first light source section 156 shown in FIG. 7 is orthogonal to the optical axis 149 of the projection lens 121, similarly to the first light source section 101 shown in FIG. 1. Meanwhile, the reflector center axis 159 of the second light source section 157 shown in FIG. 7 is orthogonal to both the optical axis 149 of the projection lens 121 and the reflector center axis 158 of the first light source section 156, unlike the second light source section 108 shown in FIG. 1. In addition, each of the first light source section 156 and the second light source section 157 has another focal point on the incident surface of the rod integrator 153.

In the third embodiment, the first object is achieved as follows. In the third embodiment, when the projection apparatus 100 is disposed horizontally and used (in horizontal projection of an image), the reflector center axis 159 of the second light source section 157 is coincident with the direction of gravity. When the light source of the first light source section 156 ruptures or comes to the end of its service life, the light source unit base 134 is rotated about the rotary shaft, whereby the first light source section 156 and the second light source section 157 are located such that their locations are interchanged with each other. Therefore, the projector can continuously be used by lighting the light source of the second light source section 157.

Next, in the third embodiment, the second object is achieved as follows. When the projection apparatus 100 is disposed horizontally and used (in horizontal projection of an image) as shown in FIG. 7, an inclination of the reflector center axis 158 of the first light source section 156 is kept equal to or lower than about 10 degrees relative to the direction perpendicular to the direction of gravity.

Figure 8:
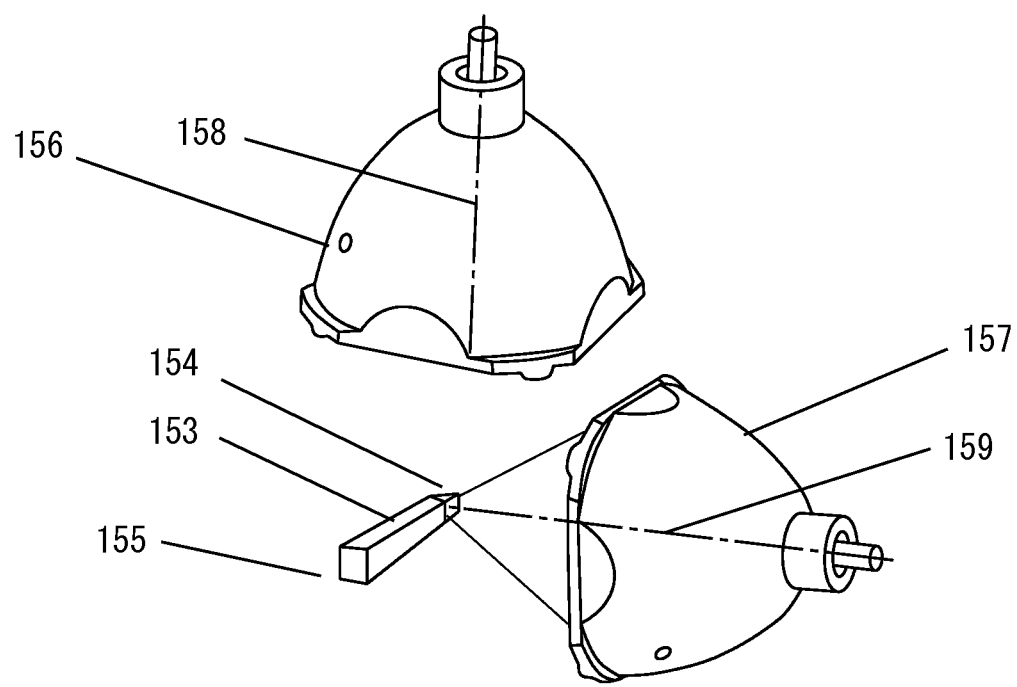
FIG. 8 is a diagram illustrating a lit-up state of a second light source section in the third embodiment.
Figure 9:
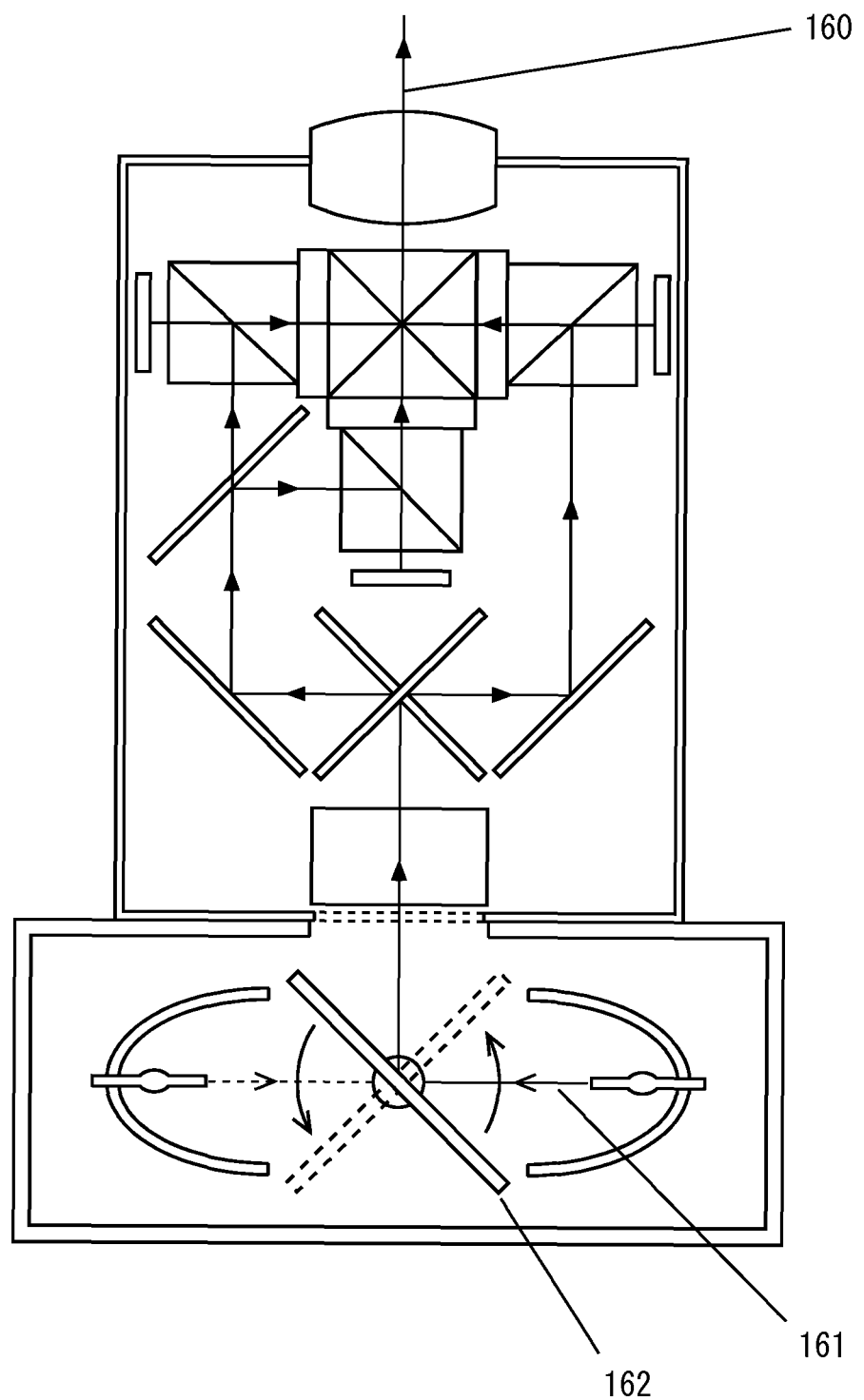
FIG. 9 is a configuration diagram of a conventional projection apparatus.

Meanwhile, the projection apparatus 100 is disposed vertically and used (in vertical projection of an image) as shown in FIG. 8, an inclination of the reflector center axis 159 of the second light source section 157 is kept equal to or less than about 10 degrees relative to the direction perpendicular to the direction of gravity. Thus, when the projection apparatus 100 is disposed vertically and used, the redirecting prism 154 is rotated by 90 degrees and located such that the incident surface thereof faces the second light source section 157. Therefore, light emitted by the light source of the second light source section 157 reaches the screen through the redirecting prism 154, the rod integrator 153, the image display element, and the projection lens 121. This operation allows the projection apparatus 100 according to the third embodiment to be used when disposed horizontally or vertically.

As described above, the projection apparatus 100 according to the third embodiment of the present invention can have a light source switching function and a projection mode selection function while ensuring desired light source performance and reliability.

It should be noted that the projection mode selection function described in the above embodiments can automatically be performed when an installed state of the projection apparatus is selected on a menu screen or an operation panel included in the main unit or when a direction of signal display from a signal source is switched. In the first and second embodiments, during horizontal display, the light source section having a reflector center axis perpendicular to the projection lens optical axis is lit and the moveable mirror is in a used state, and during vertical display, the light source section having a reflector center axis parallel to the projection lens optical axis is lit and the moveable mirror is in an unused state. In the third embodiment, both during horizontal display and during vertical display, the light source section having a reflector center axis perpendicular to the direction of gravity is lit and the switching prism is located such that the light is guided to the rod integrator.

Further, the light source use mode using the first and second light source sections and the moveable mirror described in each of the above embodiments is one example. As a matter of course, the light source use mode is different depending on the configuration of the optical system in the stage subsequent to the rod integrator. For example, when the first light source section has a positional relationship parallel to the optical axis of the projection lens, the light generated from the first light source section may directly enter the rod integrator not through the moveable mirror, and when disposed vertically, the light generated from the second light source section may be reflected by the moveable mirror and may enter the rod integrator.

While the invention has been described in detail, the foregoing description is in all aspects illustrative and not restrictive. It will be understood that numerous other modifications and variations can be devised without departing from the scope of the invention.

What is claimed is:

1. A projection apparatus including a converging optical system for guiding light generated by a light source section, and a projection optical system for modulating light, incident thereon from the converging optical system, with an external signal and projecting an image generated by the modulation on a screen in an enlarged manner, the projection apparatus comprising:

a plurality of light source sections each having a reflector and a light source that is a discharge lamp, and being in a positional relationship wherein the center axes of the reflectors are orthogonal to each other and all lie in the same plane in which the optical axis of the converging optical system lies, and wherein at least one reflector center axis is orthogonal to the optical axis of the projection optical system;

interchange means for interchanging that light source section, of the plurality of light source sections, whose reflector central axis is perpendicular to the direction of gravity, with another of the plurality of light source sections, by rotating a base to which the plurality of light source sections are fixed, about a rotational axis of the base, the base rotational axis lying in the same plane in which the reflector central axes lie; and reflection means for guiding, to the converging optical system, light from that light source section whose reflector center axis is perpendicular to the direction of gravity.

2. The projection apparatus according to claim 1, wherein the interchange means goes into operation following lapse of a predetermined in-use time period of the light source.

3. The projection apparatus according to claim 1, wherein the interchange means goes into operation when the light source is not lit.

4. A projection apparatus including a converging optical system for guiding light generated by a light source section, and a projection optical system for modulating light, incident thereon from the converging optical system, with an external signal and projecting an image generated by the modulation on a screen in an enlarged manner, the projection apparatus comprising:

a plurality of light source sections each having a reflector and a light source that is a discharge lamp, and being in a positional relationship wherein the center axes of the reflectors are orthogonal to each other and all lie in the same plane in which the optical axis of the converging optical system lies, and wherein the reflector center axes are each orthogonal to the optical axis of the projection optical system;

interchange means for interchanging that light source section, of the plurality of light source sections, whose reflector central axis is perpendicular to the direction of gravity, with another of the plurality of light source sections by rotating a base to which the plurality of light source sections are fixed, about a rotational axis of the base, the base rotational axis lying in the same plane in which the reflector central axes lie; and reflection means for guiding, to the converging optical system, light from that light source section whose reflector center axis is perpendicular to the direction of gravity.

5. The projection apparatus according to claim 4, wherein the interchange means goes into operation following lapse of a predetermined in-use time period of the light source.

6. The projection apparatus according to claim 4, wherein the interchange means goes into operation when the light source is not lit.

7. A projection apparatus including a converging optical system for guiding light generated by a light source section, and a projection optical system for modulating light, incident thereon from the converging optical system, with an external signal and projecting an image generated by the modulation on a screen in an enlarged manner, the projection apparatus comprising:

a plurality of light source sections each having a reflector and a light source that is a discharge lamp, and being in a positional relationship wherein the center axes of the reflectors are orthogonal to each other and all lie in the same plane in which the optical axis of the converging optical system lies, and wherein the reflector center axes are each orthogonal to the optical axis of the projection optical system;

interchange means for interchanging locations of the plurality of light source sections; and reflection means for guiding, to the converging optical system, light from that light source section whose reflector center axis is perpendicular to the direction of gravity, the reflection means being located near the portion of the converging optical system where light enters, and being configured to be rotatable about the optical axis of the converging optical system by 90 degrees.

8. The projection apparatus according to claim 7, wherein the interchange means goes into operation when the light source is not lit.

9. The projection apparatus according to claim 7, further comprising an orientation sensor, wherein the reflection means operates in accordance with output from the orientation sensor.

10. The projection apparatus according to claim 7, wherein the reflection means goes into operation upon having received input to switch between a setting for horizontal projection and a setting for vertical projection of images.

11. The projection apparatus according to claim 7, wherein the interchange means goes into operation following lapse of a predetermined in-use time period of the light source.

* * * * *